(12) United States Patent
Chien

(10) Patent No.: US 10,637,065 B2
(45) Date of Patent: Apr. 28, 2020

(54) LITHIUM BATTERY AND CATHODE FOIL THEREOF

(71) Applicant: APAQ TECHNOLOGY CO., LTD., Miaoli County (TW)

(72) Inventor: Ming-Goo Chien, Taichung (TW)

(73) Assignee: APAQ TECHNOLOGY CO., LTD., Miaoli County (TW)

(*) Notice: Subject to any disclaimer, the term of this patent is extended or adjusted under 35 U.S.C. 154(b) by 201 days.

(21) Appl. No.: 15/878,811

(22) Filed: Jan. 24, 2018

(65) Prior Publication Data

US 2019/0173094 A1    Jun. 6, 2019

(30) Foreign Application Priority Data

Dec. 4, 2017 (TW) .............................. 106142380 A

(51) Int. Cl.
  *H01M 4/70* (2006.01)
  *H01M 4/134* (2010.01)
  *H01M 4/66* (2006.01)
  *H01M 10/0525* (2010.01)
  *H01M 4/133* (2010.01)
  (Continued)

(52) U.S. Cl.
  CPC ............... *H01M 4/70* (2013.01); *H01G 9/04* (2013.01); *H01M 4/133* (2013.01); *H01M 4/134* (2013.01); *H01M 4/38* (2013.01); *H01M 4/661* (2013.01); *H01M 4/663* (2013.01); *H01M 4/667* (2013.01); *H01M 10/0525* (2013.01);
  (Continued)

(58) Field of Classification Search
  CPC ....... H01L 4/0426; H01L 4/133; H01L 4/134; H01L 4/661; H01L 4/70; H01L 4/38; H01L 10/0525; H01G 9/04; H01G 2009/0404; H01G 2009/0412; H01G 2009/0425
  USPC ....................................................... 429/231.8
  See application file for complete search history.

(56) References Cited

U.S. PATENT DOCUMENTS

| 7,149,076 B2 * | 12/2006 | Yuan | H01G 9/042 361/528 |
| 8,351,186 B2 * | 1/2013 | Oshima | H01G 9/045 361/532 |

(Continued)

FOREIGN PATENT DOCUMENTS

JP    2007165061 A * 6/2007

OTHER PUBLICATIONS

Machine translation of JP 2007-165061 (no date).*

Primary Examiner — Amanda C. Walke
(74) Attorney, Agent, or Firm — Li & Cai Intellectual Property (USA) Office

(57) ABSTRACT

The present disclosure provides a lithium battery and a cathode foil thereof. The cathode foil includes a base material layer, a first material layer formed on the base material layer, and a second material layer including a plurality of particle structure groups disposed inside the first material layer. Each of the particle structure groups includes a plurality of particle structures connected with each other. One of the first material layer and the second material layer is formed by a pure silicon material without impurities, and another one of the first material layer and the second material layer is formed by a pure carbon material without impurities. Therefore, the structural strength and the ion transmission efficiency of the lithium battery with the cath- (Continued)

ode foil can be increased in virtue of the particle structures that are connected with each other.

10 Claims, 6 Drawing Sheets

(51) Int. Cl.
*H01G 9/04* (2006.01)
*H01M 4/38* (2006.01)
*H01M 4/04* (2006.01)

(52) U.S. Cl.
CPC .............. *H01G 2009/0404* (2013.01); *H01G 2009/0412* (2013.01); *H01M 4/0426* (2013.01); *H01M 2220/30* (2013.01)

(56) References Cited

U.S. PATENT DOCUMENTS

| | | | |
|---|---|---|---|
| 9,001,497 B2* | 4/2015 | Oshima | H01G 9/055 361/301.5 |
| 9,172,088 B2* | 10/2015 | Loveness | H01M 4/0428 |
| 9,362,549 B2* | 6/2016 | Rojeski | H01M 4/386 |
| 9,559,348 B2* | 1/2017 | Kumaresan | H01M 4/02 |
| 9,871,248 B2* | 1/2018 | Rayner | B22F 9/04 |
| 10,205,166 B2* | 2/2019 | Li | H01M 4/133 |
| 2003/0026064 A1* | 2/2003 | Nakada | H01G 9/012 361/523 |
| 2004/0248011 A1* | 12/2004 | Asao | H01M 4/134 429/231.95 |
| 2006/0040182 A1* | 2/2006 | Kawakami | H01M 10/052 429/218.1 |
| 2009/0207557 A1* | 8/2009 | Nagara | H01G 9/02 361/504 |
| 2010/0266898 A1* | 10/2010 | Yamamoto | H01G 9/016 429/220 |
| 2011/0023955 A1* | 2/2011 | Fonash | B82Y 20/00 136/256 |
| 2017/0062834 A1* | 3/2017 | Unnikrishnan | H01M 4/661 |
| 2018/0205089 A1* | 7/2018 | Unnikrishnan | H01M 4/0404 |
| 2019/0267666 A1* | 8/2019 | Shin | H01M 4/661 |

* cited by examiner

LITHIUM BATTERY AND CATHODE FOIL THEREOF

FIELD OF THE INVENTION

The present disclosure relates to a battery and an electrode foil thereof, and more particularly to a lithium battery and a cathode foil thereof.

BACKGROUND OF THE INVENTION

Much research regarding batteries as a power source has been conducted to minimize the requisite number or size of batteries for portable electronic devices such as video cameras, cellular phones and laptop computers. In particular, rechargeable lithium batteries have around three times the energy density per unit weight of conventional storage batteries such as lead-acid batteries, nickel-cadmium batteries, nickel-hydro batteries and nickel-zinc batteries. In addition, rechargeable lithium batteries can be recharged relatively quickly.

SUMMARY OF THE INVENTION

One aspect of the present disclosure relates to a lithium battery and a cathode foil thereof.

One of the embodiments of the present disclosure provides a cathode foil for a lithium battery, including a base material layer, a first material layer formed on the base material layer, and a second material layer including a plurality of particle structure groups disposed inside the first material layer. Each of the particle structure groups includes a plurality of particle structures connected with each other. One of the first material layer and the second material layer is formed by a pure silicon material without impurities, and another one of the first material layer and the second material layer is formed by a pure carbon material without impurities.

Another one of the embodiments of the present disclosure provides a lithium battery using a cathode foil, the lithium battery being one of a cylindrical lithium battery, a square lithium battery, a button lithium battery and a thin film lithium battery, characterized in that the cathode foil includes a base material layer, a first material layer formed on the base material layer, and a second material layer having a plurality of particle structure groups disposed inside the first material layer. Each of the particle structure groups includes a plurality of particle structures connected with each other. One of the first material layer and the second material layer is formed by a pure silicon material without impurities, and another one of the first material layer and the second material layer is formed by a pure carbon material without impurities.

More particularly, the base material layer is a Cu material layer or an Al material layer, and both the first material layer and the second material layer are formed by co-sputtering or co-evaporating in a vacuum room.

More particularly, when the first material layer is formed by the pure silicon material without impurities and the second material layer is formed by the pure carbon material without impurities, the pure carbon material serves as the particle structures, and the pure silicon material can serve as a cover material for enclosing the particle structures.

More particularly, when the second material layer is formed by the pure silicon material without impurities and the first material layer is formed by the pure carbon material without impurities, the pure silicon material serves as the particle structures, and the pure carbon material can serve as a cover material for enclosing the particle structures.

More particularly, in each of the particle structure groups, each of the particle structures is connected to the adjacent at least one of the particle structures to form a continuous stacked structure, so that the structural strength and the ion transmission efficiency of the foil are increased in virtue of the continuous stacked structure.

More particularly, at least one of the particle structures of the particle structure group contacts the base material layer, and at least another one of the particle structures of the particle structure group contacts an outer surface of the first material layer and is exposed out of the outer surface of the first material layer.

More particularly, at least one of the particle structures of the particle structure group contacts the base material layer, and the particle structures of the particle structure group are separated from an outer surface of the first material layer.

More particularly, the particle structures of the particle structure group are separated from the base material layer, and at least one of the particle structures of the particle structure group contacts an outer surface of the first material layer and is exposed out of the outer surface of the first material layer.

More particularly, the particle structures of the particle structure group are separated from the base material layer, and the particle structures of the particle structure group are separated from an outer surface of the first material layer.

Therefore, the structural strength and the ion transmission efficiency of the cathode foil can be increased by matching the features of "a second material layer including a plurality of particle structure groups is disposed inside the first material layer, and each of the particle structure groups includes a plurality of particle structures connected with each other" and "one of the first material layer and the second material layer is formed by a pure silicon material without impurities, and another one of the first material layer and the second material layer is formed by a pure carbon material without impurities".

To further understand the techniques, means and effects of the present disclosure, the following detailed descriptions and appended drawings are hereby referred to, such that, and through which, the purposes, features and aspects of the present disclosure can be thoroughly and concretely appreciated. However, the appended drawings are provided solely for reference and illustration, without any intention to limit the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE PREFERRED EMBODIMENTS

Embodiments of a lithium battery and a cathode foil thereof according to the present disclosure are described herein. Other advantages and objectives of the present disclosure can be easily understood by one skilled in the art from the disclosure. The present disclosure can be applied in different embodiments. Various modifications and variations can be made to various details in the description for different applications without departing from the scope of the present disclosure. The drawings of the present disclosure are provided only for simple illustrations, but are not drawn to scale and do not reflect the actual relative dimensions. The following embodiments are provided to describe in detail the concept of the present disclosure, and are not intended to limit the scope thereof in any way.

It should be noted that the terms "first", "second", "third", etc. may be used herein to describe various elements or signals; however, such terms should not be construed as limiting the elements or signals. These terms are used mainly for distinguishing one element from another, or distinguishing one signal from another. In addition, the term "or" may be used to include any one or any combination of the listed items, as the case may be.

First Embodiment

Figure 1:
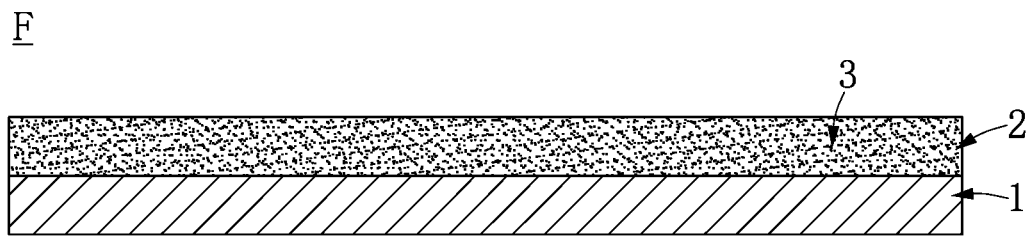
FIG. 1 shows a schematic view of a cathode foil for a lithium battery according to a first embodiment of the present disclosure.
Figure 2:
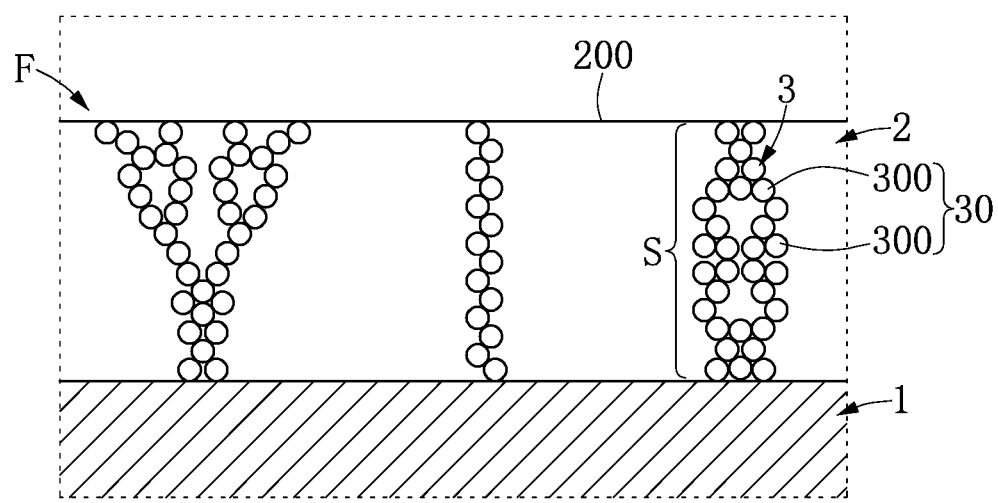
FIG. 2 shows an enlarged, schematic view of the cathode foil for the lithium battery according to the first embodiment of the present disclosure.

Reference is made to FIG. 1 and FIG. 2. FIG. 1 shows a schematic view of a cathode foil for a lithium battery according to a first embodiment of the present disclosure, and FIG. 2 shows an enlarged, schematic view of the cathode foil for the lithium battery according to the first embodiment of the present disclosure. The first embodiment of the present disclosure provides a cathode foil F, including a base material layer 1, a first material layer 2 and a second material layer 3.

More particularly, referring to FIG. 1 and FIG. 2, the first material layer 2 is formed on the base material layer 1, the second material layer 3 includes a plurality of particle structure groups 30 disposed inside the first material layer 2, and each of the particle structure groups 30 includes a plurality of particle structures 300 connected with each other. For example, the base material layer 1 may be a Cu material layer, an Al material layer or any conductive material layer, and both the first material layer 2 and the second material layer 3 can be formed by co-sputtering or co-evaporating in a vacuum chamber. For another example, both the first material layer 2 and the second material layer 3 can exemplarily be formed by sequential evaporation in a vacuum chamber (or a vacuum environment). However, the examples are not meant to limit the scope of the present disclosure.

More particularly, as shown in FIG. 1, one of the first material layer 2 and the second material layer 3 is formed by a pure silicon material without impurities (i.e., 100% silicon), and another one of the first material layer 2 and the second material layer 3 is formed by a pure carbon material without impurities (i.e., 100% carbon). That is to say, the first material layer 2 can be formed by the pure silicon material without impurities or the pure carbon material without impurities according to different requirements, and the second material layer 3 can be formed by the pure silicon material without impurities or the pure carbon material without impurities according to different requirements, as long as the first material layer 2 and the second material layer 3 are respectively formed by two different materials.

For example, referring to FIG. 1 and FIG. 2, when the first material layer 2 is formed by the pure silicon material without impurities and the second material layer 3 is formed by the pure carbon material without impurities, the pure carbon material can be made as the particle structures 300, and the pure silicon material can serve as a cover material for enclosing the particle structures 300. However, the example is not meant to limit the scope of the present disclosure.

For example, referring to FIG. 1 and FIG. 2, when the second material layer 3 is formed by the pure silicon material without impurities and the first material layer 2 is formed by the pure carbon material without impurities, the pure silicon material can be made as the particle structures 300, and the pure carbon material can serve as a cover material for enclosing the particle structures 300. However, the example is not meant to limit the scope of the present disclosure.

It should be noted that at least one of the particle structures 300 (such as the bottommost particle structure 300) of the particle structure group 30 can be in contact with the base material layer 1, and at least another one of the particle structures 300 (such as the topmost particle structure 300) of the particle structure group 30 can be in contact with an outer surface 200 of the first material layer 2 and can be exposed out of the outer surface 200 of the first material layer 2, as shown in FIG. 2.

Therefore, as shown in FIG. 2, in each of the particle structure groups 30, each of the particle structures 300 is connected to the adjacent at least one of the particle structures 300 (i.e., each particle structure 300 is connected to at least another one of the particle structures 300, so that none of the particle structures 300 are isolated) to form a continuous stacked structure S, so that the structural strength and the ion transmission efficiency of the cathode foil F can be increased in virtue of the continuous stacked structure S. Naturally, the ion storage space of the cathode foil F can also be increased in virtue of the continuous stacked structure S.

Second Embodiment

Figure 3:
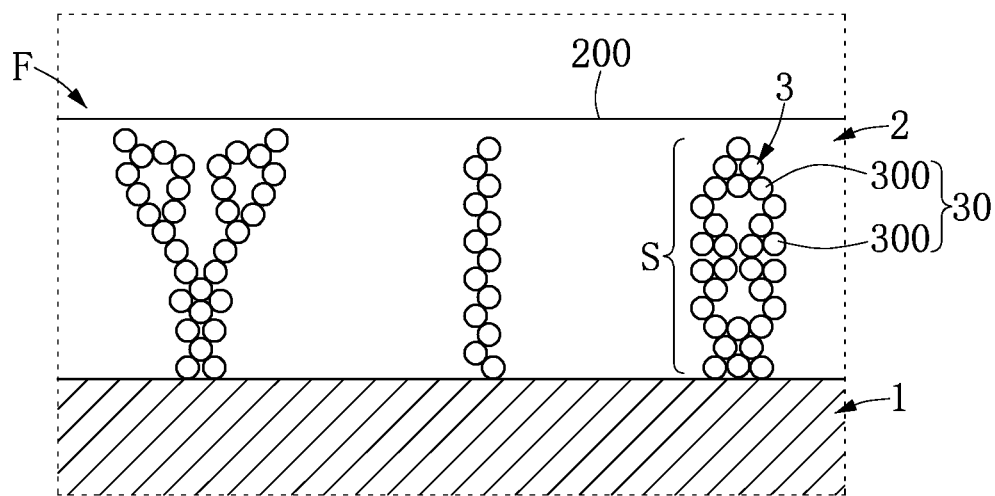
FIG. 3 shows an enlarged, schematic view of the cathode foil for the lithium battery according to a second embodiment of the present disclosure.

Reference is made to FIG. 3, in which an enlarged, schematic view of the cathode foil for the lithium battery according to a second embodiment of the present disclosure is shown. The second embodiment of the present disclosure provides a cathode foil F, including a base material layer 1, a first material layer 2 and a second material layer 3. Comparing FIG. 3 with FIG. 2, the difference between the second embodiment and the first embodiment is as follows:

in the second embodiment, at least one of the particle structures 300 (such as the bottommost particle structure 300) of the particle structure group 30 can be in contact with the base material layer 1, and the particle structures 300 of the particle structure group 30 can be separated from an outer surface 200 of the first material layer 2 (that is to say, each particle structure 300 of the particle structure group 30 and the outer surface 200 of the first material layer 2 are separated without contacting each other).

Therefore, as shown in FIG. 3, in each of the particle structure groups 30, each of the particle structures 300 is connected to the adjacent at least one of the particle structures 300 (i.e., each particle structure 300 is connected to at least another one of the particle structures 300, so that none of the particle structures 300 are isolated) to form a continuous stacked structure S, so that the structural strength and the ion transmission efficiency of the cathode foil F can be increased in virtue of the continuous stacked structure S. Naturally, the ion storage space of the cathode foil F can also be increased in virtue of the continuous stacked structure S.

Third Embodiment

Figure 4:
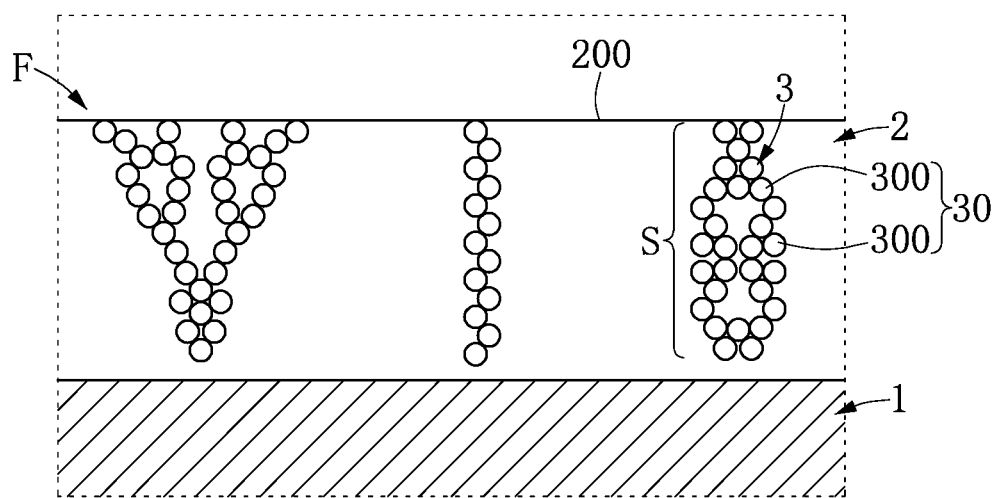
FIG. 4 shows an enlarged, schematic view of the cathode foil for the lithium battery according to a third embodiment of the present disclosure.

Reference is made to FIG. 4, in which an enlarged, schematic view of the cathode foil for the lithium battery according to a third embodiment of the present disclosure is shown. The third embodiment of the present disclosure provides a cathode foil F, including a base material layer 1, a first material layer 2 and a second material layer 3. Comparing FIG. 4 with FIG. 2, the difference between the third embodiment and the first embodiment is as follows: in the third embodiment, the particle structures 300 of the particle structure group 30 can be separated from the base material layer 1 (that is to say, each particle structure 300 and the base material layer 1 are separated without contacting each other), and at least one of the particle structures 300 (such as the topmost particle structure 300) of the particle structure group 30 can contact an outer surface 200 of the first material layer 2 and can be exposed out of the outer surface 200 of the first material layer 2.

Therefore, as shown in FIG. 4, in each of the particle structure groups 30, each of the particle structures 300 is connected to the adjacent at least one of the particle structures 300 (i.e., each particle structure 300 is connected to at least another one of the particle structures 300, so that none of the particle structures 300 are isolated) to form a continuous stacked structure S, so that the structural strength and the ion transmission efficiency of the cathode foil F can be increased in virtue of the continuous stacked structure S. Naturally, the ion storage space of the cathode foil F can also be increased in virtue of the continuous stacked structure S.

Fourth Embodiment

Figure 5:
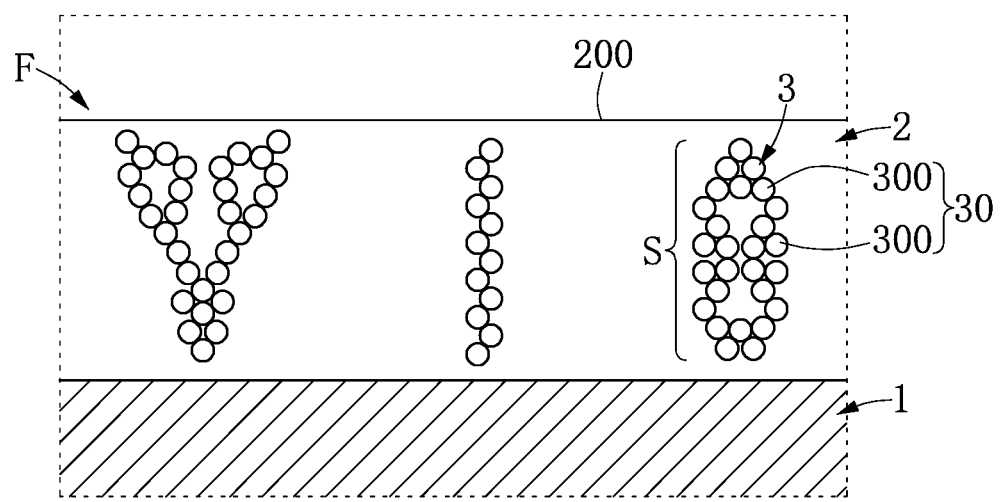
FIG. 5 shows an enlarged, schematic view of the cathode foil for the lithium battery according to a fourth embodiment of the present disclosure.

Referring to FIG. 5, FIG. 5 shows an enlarged, schematic view of the foil for the lithium battery according to a fourth embodiment of the present disclosure. The fourth embodiment of the present disclosure provides a cathode foil F, including a base material layer 1, a first material layer 2 and a second material layer 3. Comparing FIG. 5 with FIG. 2, the difference between the fourth embodiment and the first embodiment is as follows: in the fourth embodiment, the particle structures 300 of the particle structure group 30 can be separated from the base material layer 1 without contacting the base material layer 1, and the particle structures 300 of the particle structure group 30 can be separated from an outer surface 200 of the first material layer 2 without contacting the outer surface 200 of the first material layer 2.

Therefore, as shown in FIG. 5, in each of the particle structure groups 30, each of the particle structures 300 is connected to the adjacent at least one of the particle structures 300 (i.e., each particle structure 300 is connected to at least another one of the particle structures 300, so that none of the particle structures 300 are isolated) to form a continuous stacked structure S, so that the structural strength and the ion transmission efficiency of the cathode foil F can be increased in virtue of the continuous stacked structure S. Naturally, the ion storage space of the cathode foil F can also be increased in virtue of the continuous stacked structure S.

Fifth Embodiment

Figure 6:
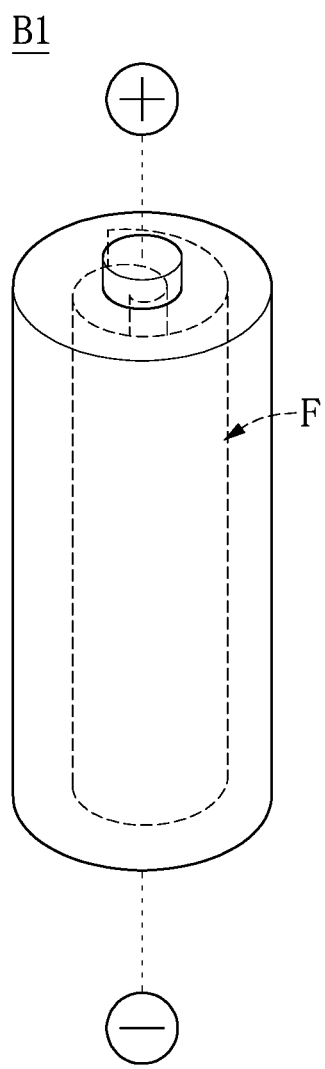
FIG. 6 shows a schematic view of a cylindrical lithium battery according to a fifth embodiment of the present disclosure.
Figure 7:
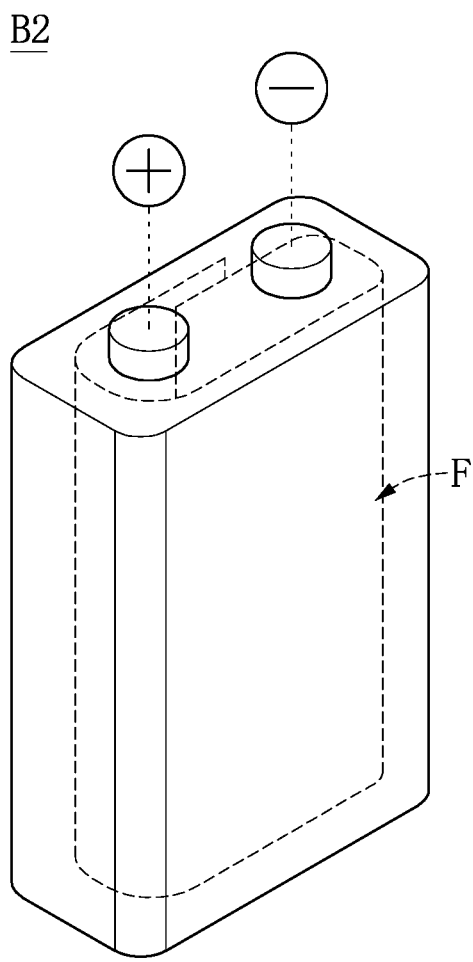
FIG. 7 shows a schematic view of a square lithium battery according to the fifth embodiment of the present disclosure.
Figure 8:
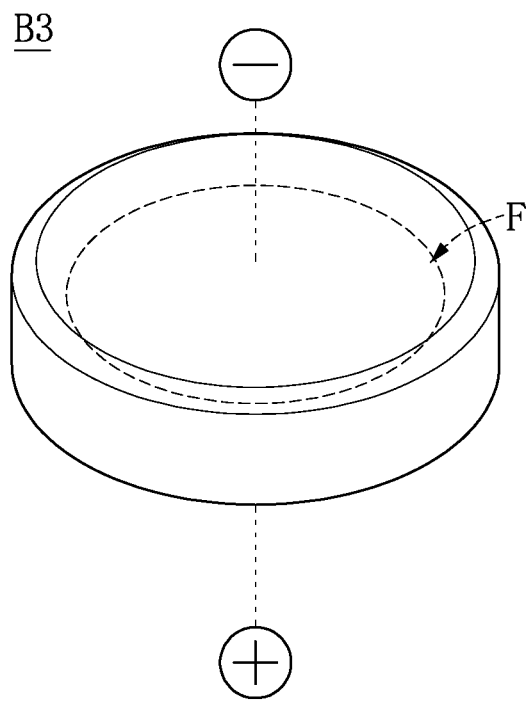
FIG. 8 shows a schematic view of a button lithium battery according to the fifth embodiment of the present disclosure.
Figure 9:
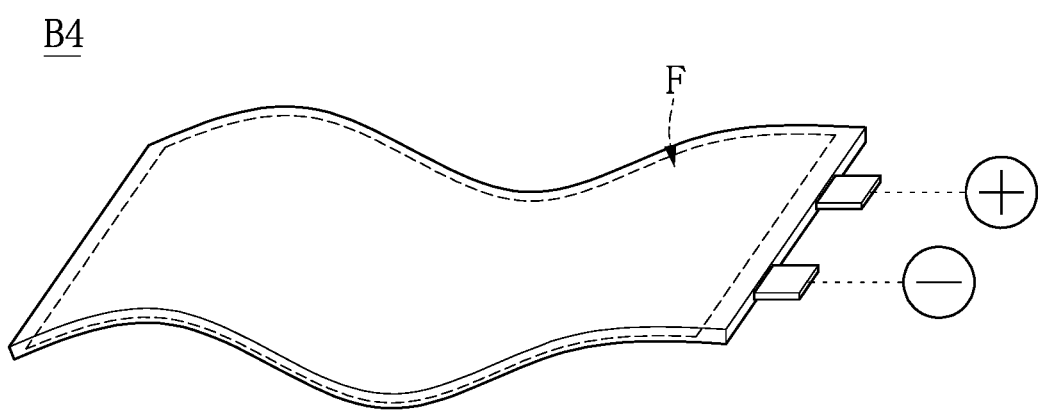
FIG. 9 shows a schematic view of a thin film lithium battery according to the fifth embodiment of the present disclosure.

Reference is made to FIG. 6 to FIG. 9. FIG. 6 shows a schematic view of a cylindrical lithium battery according to a fifth embodiment of the present disclosure, and FIG. 7 shows a schematic view of a square lithium battery according to the fifth embodiment of the present disclosure, FIG. 8 shows a schematic view of a button lithium battery according to the fifth embodiment of the present disclosure, and FIG. 9 shows a schematic view of a thin film lithium battery according to the fifth embodiment of the present disclosure. The fifth embodiment of the present invention provides a lithium battery using a cathode foil F of one of the first to the fourth embodiments, and the lithium battery may be one of a cylindrical lithium battery B1 (as shown in FIG. 6), a square lithium battery B2 (as shown in FIG. 7), a button lithium battery B3 (as shown in FIG. 8), and a thin film lithium battery B4 (as shown in FIG. 9).

Therefore, the structural strength, the ion transmission efficiency and the ion storage space of the cathode foil F can be increased in virtue of the continuous stacked structure S, so that the structural strength, the ion transmission efficiency and the ion storage space of the lithium battery using the cathode foil F can also be increased in virtue of the continuous stacked structure S.

In conclusion, the structural strength and the ion transmission efficiency of the cathode foil F can be increased by matching the features of "the second material layer 3 includes a plurality of particle structure groups 30 disposed inside the first material layer 2, and each of the particle structure groups 30 includes a plurality of particle structures 300 connected with each other" and "one of the first material layer 2 and the second material layer 3 is formed by a pure silicon material without impurities, and another one of the first material layer 2 and the second material layer 3 is formed by a pure carbon material without impurities". That is to say, the structural strength and the ion transmission efficiency of the lithium battery with the cathode foil F can be increased in virtue of the particle structures 300 that are connected with each other to form a continuous stacked structure S.

The aforementioned descriptions merely represent the preferred embodiments of the present disclosure, without any intention to limit the scope of the present disclosure which is fully described only within the following claims. Various equivalent changes, alterations or modifications based on the claims of the present disclosure are all, consequently, viewed as being embraced by the scope of the present disclosure.

What is claimed is:

1. A cathode foil for a lithium battery, comprising:
a base material layer;
a first material layer formed on the base material layer; and
a second material layer including a plurality of particle structure groups disposed inside the first material layer, each of the particle structure groups including a plurality of particle structures connected with each other;
wherein one of the first material layer and the second material layer is formed by a pure silicon material without impurities, and another one of the first material layer and the second material layer is formed by a pure carbon material without impurities;
wherein when the first material layer is formed by the pure silicon material without impurities and the second material layer is formed by the pure carbon material without impurities, the pure carbon material serves as the particle structures, and the pure silicon material serves as a cover material for enclosing the particle structures;
wherein when the second material layer is formed by the pure silicon material without impurities and the first material layer is formed by the pure carbon material without impurities, the pure silicon material serves as the particle structures, and the pure carbon material serves as a cover material for enclosing the particle structures;
wherein in each of the particle structure groups, each of the particle structures is connected to the adjacent at least one of the particle structures to form a continuous stacked structure, so that the structural strength and the ion transmission efficiency of the cathode foil are increased in virtue of the continuous stacked structure.

2. The cathode foil of claim 1, wherein the base material layer is a Cu material layer or an Al material layer, and both the first material layer and the second material layer are formed by co-sputtering or co-evaporating in a vacuum chamber, wherein at least one of the particle structures of the particle structure group contacts the base material layer, and at least another one of the particle structures of the particle structure group contacts an outer surface of the first material layer and is exposed out of the outer surface of the first material layer.

3. The cathode foil of claim 1, wherein the base material layer is a Cu material layer or an Al material layer, and both the first material layer and the second material layer are formed by co-sputtering or co-evaporating in a vacuum chamber, wherein at least one of the particle structures of the particle structure group contacts the base material layer, and the particle structures of the particle structure group are separated from an outer surface of the first material layer.

4. The cathode foil of claim 1, wherein the base material layer is a Cu material layer or an Al material layer, and both the first material layer and the second material layer are formed by co-sputtering or co-evaporating in a vacuum chamber, wherein the particle structures of the particle structure group are separated from the base material layer, and at least one of the particle structures of the particle structure group contacts an outer surface of the first material layer and is exposed out of the outer surface of the first material layer.

5. The cathode foil of claim 1, wherein the base material layer is a Cu material layer or an Al material layer, and both the first material layer and the second material layer are formed by co-sputtering or co-evaporating in a vacuum chamber, wherein the particle structures of the particle structure group are separated from the base material layer, and the particle structures of the particle structure group are separated from an outer surface of the first material layer.

6. A lithium battery using a cathode foil, the lithium battery being one of a cylindrical lithium battery, a square lithium battery, a button lithium battery and a thin film lithium battery, characterized in that the cathode foil comprises:
a base material layer;
a first material layer formed on the base material layer; and
a second material layer including a plurality of particle structure groups disposed inside the first material layer, each of the particle structure groups including a plurality of particle structures connected with each other;
wherein one of the first material layer and the second material layer is formed by a pure silicon material without impurities, and another one of the first material layer and the second material layer is formed by a pure carbon material without impurities;
wherein when the first material layer is formed by the pure silicon material without impurities and the second material layer is formed by the pure carbon material without impurities, the pure carbon material serves as the particle structures, and the pure silicon material serves as a cover material for enclosing the particle structures;
wherein when the second material layer is formed by the pure silicon material without impurities and the first material layer is formed by the pure carbon material without impurities, the pure silicon material serves as the particle structures, and the pure carbon material serves as a cover material for enclosing the particle structures;
wherein in each of the particle structure groups, each of the particle structures is connected to the adjacent at least one of the particle structures to form a continuous stacked structure, so that the structural strength and the ion transmission efficiency of the cathode foil are increased in virtue of the continuous stacked structure.

7. The lithium battery of claim 6, wherein at least one of the particle structures of the particle structure group contacts the base material layer, and at least another one of the particle structures of the particle structure group contacts an outer surface of the first material layer and is exposed out of the outer surface of the first material layer.

8. The lithium battery of claim 6, wherein at least one of the particle structures of the particle structure group contacts the base material layer, and the particle structures of the particle structure group are separated from an outer surface of the first material layer.

9. The lithium battery of claim 6, wherein the particle structures of the particle structure group are separated from the base material layer, and at least one of the particle structures of the particle structure group contacts an outer surface of the first material layer and is exposed out of the outer surface of the first material layer.

10. The lithium battery of claim 6, wherein the particle structures of the particle structure group are separated from the base material layer, and the particle structures of the particle structure group are separated from an outer surface of the first material layer.

* * * * *